Feb. 7, 1950 — A. W. ANISH — 2,496,843
PHOTOGRAPHIC ELEMENTS CONTAINING HYDROXY HEAVY
METAL SALTS OF TRINUCLEAR IMINOL CYANINE
DYES AS FILTER AND ANTIHALATION DYES
Original Filed Jan. 19, 1945

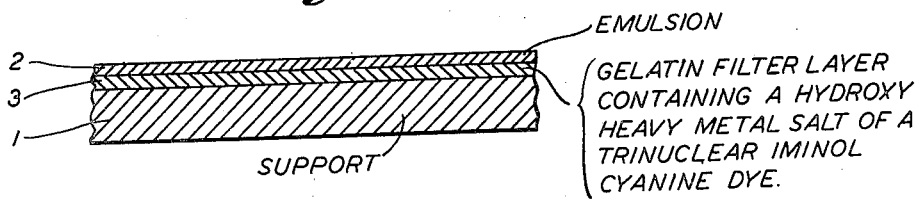

Fig. 1.

EMULSION
GELATIN FILTER LAYER CONTAINING A HYDROXY HEAVY METAL SALT OF A TRINUCLEAR IMINOL CYANINE DYE.
SUPPORT

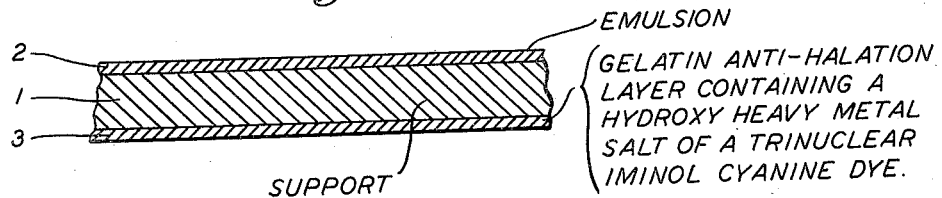

Fig. 2.

EMULSION
GELATIN ANTI-HALATION LAYER CONTAINING A HYDROXY HEAVY METAL SALT OF A TRINUCLEAR IMINOL CYANINE DYE.
SUPPORT

Inventor
Alfred W. Anish,
By
Attorneys

Patented Feb. 7, 1950

2,496,843

UNITED STATES PATENT OFFICE 2,496,843

PHOTOGRAPHIC ELEMENTS CONTAINING HYDROXY HEAVY METAL SALTS OF TRINUCLEAR IMINOL CYANINE DYES AS FILTER AND ANTIHALATION DYES

Alfred W. Anish, Vestal, N. Y., assignor to General Aniline & Film Corporation, New York, N. Y., a corporation of Delaware Application March 14, 1945, Serial No. 582,819, now Patent No. 2,450,390, dated September 28, 1948, which is a division of application Serial No. 573,631, January 19, 1945, now Patent No. 2,471,996, dated May 31, 1949. Divided and this application March 10, 1948, Serial No. 14,148

8 Claims. (Cl. 95—8)

This invention relates to filter and anti-halation dyes for photographic materials, and particularly to hydroxy heavy metal salts of trinuclear iminol cyanine dyes as photographic filter and anti-halation dyes.

Cyanine dyes containing more than two nuclei are already known. Dyes of this category are illustrated, for example, in United States Patent 2,276,554, and in British Patent 489,335. It will be noted that in the dyes referred to in these patents the nucleus appearing in the dye, in addition to the two terminal nitrogenous heterocyclic nuclei, is heterocyclic in character and of the type known as rhodanine nucleus. In these dyes, however, the central heterocyclic nucleus serves to supply the terminals of two distinct resonating systems.

I have now discovered a new class of trinuclear iminol cyanine dyes in which two heterocyclic nitrogenous nuclei are linked by a monomethine radical, and in which the third heterocyclic nitrogenous nucleus, though joined to the monomethine chain, contributes a terminal common to a shared resonating system involving the other two nuclei. These new dyestuffs have certain significant properties which are not possessed by the known dyestuffs. For instance, the dyes are not only excellent sensitizers for silver-halide emulsions, but also form stable silver salts with silver ions. These properties not only make the dyes valuable as sensitizing dyes, but also as filter and anti-halation dyes for silver-halide emulsions.

The primary object of the present invention is to provide a new class of hydroxy metal salts of trinuclear iminol cyanine dyes as filter and antihalation dyes for photographic materials.

Another object is to provide colored compounds which form non-diffusing silver salts readily dischargeable in the usual processing baths.

A further object is to provide filter and antihalation dyes which have no deleterious effect on the photographic properties of the film.

A still further object is to provide trinuclear iminol cyanines as filter and anti-halation dyes in the form of their hydroxy heavy metal salts, and preferably in the form of their silver salts.

Other objects and advantages of this invention will be apparent by reference to the following specification in which its preferred details and embodiments are described.

I have found that when a methylene bis-azole is condensed with a five-membered or six-membered heterocyclic ring system, in the presence of a basic condensing agent, trinuclear iminol cyanine dyes are formed which are not only excellent sensitizers for photographic emulsions, but are also excellent filter and anti-halation dyes for photographic emulsions.

The trinuclear iminol cyanine dyes prepared according to the present invention are characterized by the following general formula:

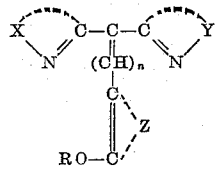

wherein X and Y are the same or different and represent the atoms necessary to complete a heterocyclic ring system of the type usual in cyanine dyes, e. g., substituted or unsubstituted indolenines, lepidines, oxazoles, oxazolines, selenazoles, selenazolines, pyridine, quinoline, thiazoles, thiazolines; diazoles and quinazolines and the corresponding substituted or unsubstituted polycyclic compounds such as benzothiazoles, benzoselenazoles, naphthothiazoles, naphthoselenazoles, diazines and the like, Z represents the atoms necessary to complete a five-membered or six-membered heterocyclic nucleus, e. g., a substituted or unsubstituted barbituric acid, thiobarbituric acid, rhodanine, oxazoledione, thiazolon, pyrazolone, imidazolone, imidazoledione and the like, $n$ represents a positive odd integer not greater than five, and R is either hydrogen or a heavy metal, e. g., silver, lead, mercury and the like.

The process of preparing the above trinuclear iminol cyanines comprises heating on a steam bath or under reflux conditions an alcoholic solution of a methylene bis-azole with a five-membered or six-membered heterocyclic intermediate derived from barbituric acid, thio-barbituric acid, rhodanine, hydantoin (imidazolone), thiohydantoin (imidazoledione), oxazoledione, thiazolone or pyrazolone having a reactive acetanilido group linked to a ring carbon atom next adjacent to a keto group of such intermediate in the presence of an alkaline condensing agent.

The symmetrical methylene bis-azoles used in the preparation of the new dyes of the present invention are describd in the "Journal of the Chemical Society," 121, p. 464, 1922, and the unsymmetrical methylene bis-azoles are described in United States Patent 2,323,503.

The five-membered heterocyclic intermediates derived from rhodanine, thiazolone, hydantoin, oxazoledione and pyrazolone are described in United States Patent 2,186,608 and represented by the general formula:

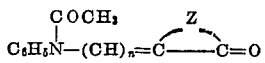

wherein Z and $n$ have the same values as indicated above under the general formula. More particularly, the compounds represented by this general formula are as follows:

4-($\gamma$-acetanilidoallylidene)-1-benzothiazolyl-3-methyl-5-pyrazolone, 4-($\gamma$-acetanilidoallylidene)-3-methyl-1-phenyl-5-pyrazolone, 5-acetanilidomethylene-3-allylrhodanine, 5-acetanilidopropadienylidene-3-allylrhodanine, 5-acetanilidomethylene-3-phenylrhodanine, 5-acetanilidomethylene-3-ethylrhodanine, 5-acetanilidomethylene-3-ethyl-2-thio-2,4(3,5)-oxazoledione, 5-($\gamma$-acetanilidoallylidene)-2-diphenylamino-4(5)-thiazolone, 5-($\gamma$-acetanilidoallylidene)-3-ethyl-2-thio-2,4(3,5)-oxazoledione, 5-($\gamma$-acetanilidoallylidene)-3-ethyl-1-phenyl-2-thiohydantoin, 5-(5-acetanilido-$\Delta^{2,4}$-pentadienylidene)-3-ethylrhodanine.

As condensing agents employed in the preparation of the new dyes of the present invention, the following may be employed: heterocyclic nitrogenous bases such as pyridine, dimethylpyridine, ethylpyridine, ethylmethylpyridine, trimethylpyridine, quinoline and the like, using basic catalysts, such as triethylamine, tributylamine, sodium or potassium carbonate, or acid condensing agents such as acetic acid or acetic anhydride. In general, the amount of condensing agent used may vary within wide limits, e. g., from 1 to 25 mols. Concentrations ranging from 1 mol to about 15 mols are preferred.

When 1 mol of a methylene bis-azole is condensed with 1 mol of a five or six-membered heterocyclic intermediate in the presence of a condensing agent, for instance, pyridine, a reaction occurs which may be written as follows:

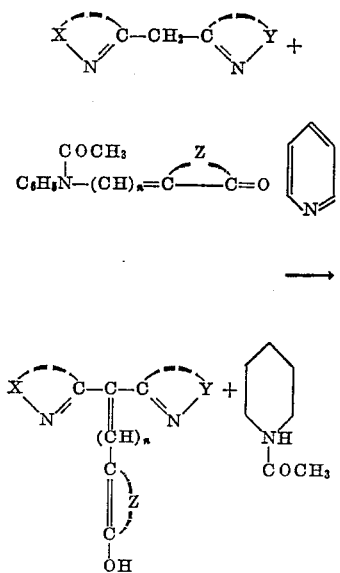

The following examples describe in detail the methods for accomplishing the above objects, but it is to be understood that they are inserted merely for the purpose of illustrations and are not to be construed as limiting the scope of the invention.

EXAMPLE I 2-diphenylamino-4-hydroxy-5-[$\delta,\delta$-dibenzothiazolylbutadienyl (1,3)]-thiazoline

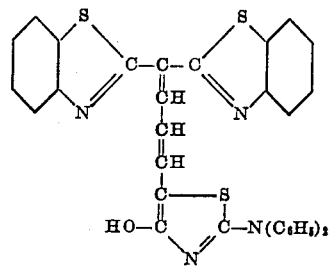

2.8 grams (1 mol) of methylene bis-benzthiazole and 4.4 grams (1 mol) of 5-($\gamma$-acetanilidoallylidene)-2-diphenylamino-4(5)-thiazolone were mixed in 20 cc. of dry pyridine containing 1 cc. of triethylamine. The mixture was boiled under reflux for 1½ hours, cooled and then diluted with 5 cc. of water. The mixture was stirred vigorously for a few minutes and then further diluted with 10 cc. of water. On standing an oil separated out which was segregated from the supernatant liquid by decantation. The oil was dissolved in a minimum amount of methanol and diluted with 5% perchloric acid solution. The dye which separated was boiled out twice with 95% ethyl alcohol and then dried.

EXAMPLE II 2-thio-3-ethyl-4-hydroxy-5-[$\delta,\delta$-dibenzothiazolyl-butadienyl (1,3)]-dihydroxazole

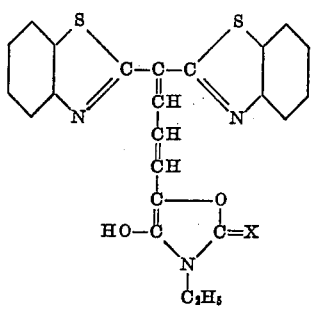

2.8 grams (1 mol) methylene bis-benzthiazole and 3.3 grams (1 mol) of 5-($\gamma$-acetanilidoallylidene)-3-ethyl-2-thio-2,4 (3,5)-oxazoledione were mixed with 20 cc. of dry pyridine containing 1 cc. of triethylamine. The mixture was boiled under reflux for 1½ hours, cooled and then diluted with 5 cc. of water. The mixture was stirred vigorously for a few minutes and then further diluted with 10 cc. of water. On standing an oil separated out which was segregated from the supernatant liquid by decantation. The oil was dissolved in a minimum amount of methanol and diluted with 5% perchloric acid solution. The dye which separated was boiled out twice with 95% ethyl alcohol and then dried.

EXAMPLE III

*1-phenyl-2-thio-3-ethyl-4-hydroxy-5-[δ,δ-di-benzoxazolyl-butadienyl (1,3)]-dihydroimidazole*

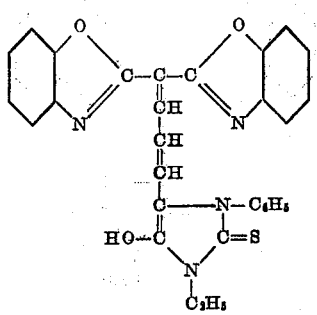

2.5 grams (1 mol) of methylene bis-benzoxazole and 3.6 grams (1 mol) of 5-(γ-acetanilidoallylidene)-3-ethyl-1-phenyl-2-thiohydantoin were mixed with 20 cc. of dry pyridine containing 1 cc. of triethylamine. The mixture was boiled under reflux for 1½ hours, cooled and then diluted with 5 cc. of water. The mixture was stirred vigorously for a few minutes and then further diluted with 10 cc. of water. On standing an oil separated out which was segregated from the supernatant liquid by decantation. The oil was dissolved in a minimum amount of methanol and diluted with 5% perchloric acid solution. The dye which separated was boiled out twice with 95% ethyl alcohol and then dried.

EXAMPLE IV

*1-phenyl-3-methyl-5-hydroxy-4-[δ-benzoxa-δ-benzothiazolyl-butadienyl (1,3)]-pyrazole*

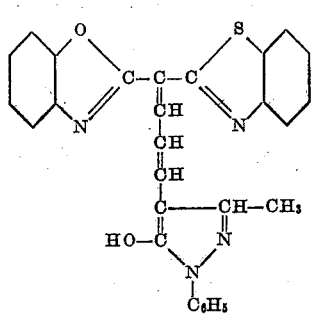

2.6 grams (1 mol) of 2-benzoxazolyl-2'-benzthiazolyl methane and 3.4 grams (1 mol) of 4-(γ-acetanilidoallylidene)-3-methyl-1-phenyl-5-pyrazolone were mixed with 20 cc. of dry quinoline containing 1 cc. of triethylamine. The mixture was boiled under reflux for 1½ hours, cooled and then diluted with 5 cc. of water. The mixture was stirred vigorously for a few minutes and then further diluted with 10 cc. of water. On standing an oil separated out which was segregated from the supernatant liquid by decantation. The oil was dissolved in a minimum amount of methanol and diluted with 5% perchloric acid solution. The dye which separated was boiled out twice with 95% ethyl alcohol and then dried.

EXAMPLE V

*2 - thio - 3 - ethyl - 4 - hydroxy - 5 - [ω,ω - dibenzothiazole - hexatrienyl (1,3,5)] - dihydrothiazole*

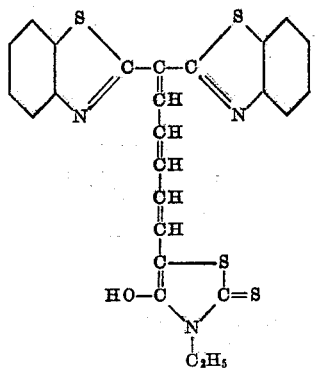

2.8 grams (1 mol) of methylene bis-benzthiazole and 3.6 grams (1 mol) of 5-(5-acetanilido-$\Delta^{2,4}$ - pentadienylidene) - 3 - ethylrhodanine were mixed in 20 cc. of dry ethyl pyridine containing 1 cc. of tributylamine. The mixture was boiled under reflux for 1½ hours, cooled and then diluted with 5 cc. of water. The mixture was stirred vigorously for a few minutes and then further diluted with 10 cc. of water. On standing an oil separated out which was segregated from the supernatant liquid by decantation. The oil was dissolved in a minimum amount of methanol and diluted with 5% perchloric acid solution. The dye which separated was boiled out twice with 95% ethyl alcohol and then dried.

EXAMPLE VI

*2 - thio - 3 - allyl - 4 - hydroxy - 5 - (β,β - dibenzothiazolyl-ethenyl)-dihydrothiazole*

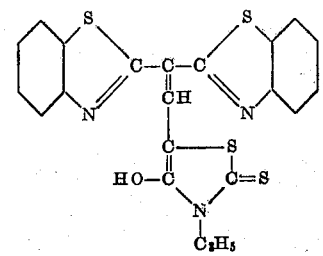

1.4 grams of methylene bis-benzthiazole and 1.6 grams of 3-allyl-5-acetanilidomethylene rhodanine were dissolved in 15 cc. of dry pyridine containing 1 cc. of triethylamine. The mixture was refluxed for 1½ hours, cooled and then diluted with 5 cc. of water. The mixture was stirred vigorously and then further diluted with 10 cc. of water. The oil which separated soon thickened and the liquid portion was decanted. The oil was dissolved in a minimum amount of methanol and diluted liberally with a 5% perchloric acid solution. The dye which separated was boiled out twice with ethyl alcohol.

An ethyl alcohol solution of 20 mg. of the dye was incorporated in 1 kilogram of silver chloride emulsion containing a small amount of silver bromide and having a total content of 4-5% silver-halide. The dye imparts a sensitivity to about 650 m$\mu$, with a maximum sensitivity at about 600 m$\mu$.

EXAMPLE VII

2 - thio - 3 - allyl - 4 - hydroxy - 5 - (β,β - dibenzoxazolyl-ethenyl)-dihydrothiazole

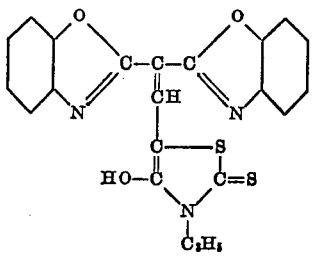

Five grams of methylene bis-benzoxazole and 6.4 grams of 3-allyl-5-acetanilidomethylene rhodanine were dissolved in 30 cc. of dry pyridine and 5 grams of anhydrous sodium acetate added. The mixture was refluxed for 3 hours, cooled and water added to precipitate the dye as an oil. The cooled mixture was allowed to stand overnight and the solidified oil filtered off and washed with water. The crude dye was re-dissolved in 60 cc. of pyridine and carefully diluted with water until cloudy. The dilute pyridine solution was chilled for 4–5 hours, and the unreacted materials filtered off. The filtrate was treated with a 5% perchloric acid solution until cloudy, and on standing the dye crystals separated. The dye was washed with water and dried.

An ethyl alcohol solution of 20 mg. of the dye was incorporated in 1 kilogram of silver chloride emulsion containing a small amount of silver bromide and having a total content of 4–5% silver-halide. The dye imparts a sensitivity to about 630 m$\mu$, with a maximum sensitivity at about 570 m$\mu$.

EXAMPLE VIII

2 - thio - 3 - allyl - 4 - hydroxy - 5 - (δ - benzoxazolyl - δ - benzothiazolyl - ethenyl) - dihydrothiazole

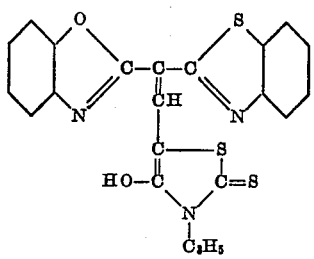

The procedure for the preparation of the above dye was the same as that of Example VII with the exception that 2.7 grams of benzoxazolyl-2'-benzothiazolyl methane and 3.2 grams of 3-allyl-5-acetanilidomethylene rhodanine were used as the starting materials.

An ethyl alcohol solution of 20 mg. of the dye was incorporated in 1 kilogram of silver chloride emulsion containing a small amount of silver bromide and having a total content of 4–5% silver-halide. The dye imparts a sensitivity to about 640 m$\mu$, with a maximum sensitivity at about 590 m$\mu$.

EXAMPLE IX 2-thio-3-allyl-4-hydroxy-5-[δ,δ-dibenzothiazolyl-butadienyl (1,3)]-dihydrothiazole

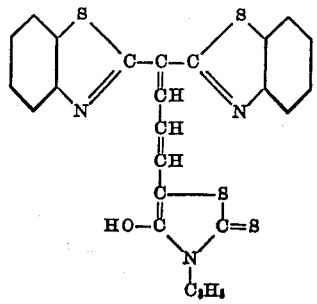

3.4 grams of 3-allyl-5-acetanilidopropadienyl-1,3-rhodanine, and 3.2 grams of methylene bis-benzthiazole were dissolved in 30 cc. of dry pyridine and 0.5 cc. of triethylamine added. The mixture was heated on a steam bath for 30 minutes. The reaction mixture was diluted out with an equal volume of water. On standing an oil separated which was separated from the supernatant liquid by decantation. The oil was dissolved in a minimum amount of methanol and diluted with a 5% perchloric acid solution. The dye which separated was boiled out twice with 95% ethyl alcohol.

An ethyl alcohol solution of 20 mg. of the dye was incorporated in 1 kilogram of silver chloride emulsion containing a small amount of silver bromide and having a total content of 4–5% silver-halide. The dye imparts a sensitivity to about 620 m$\mu$, with a maximum sensitivity at about 570 m$\mu$.

EXAMPLE X 6-hydroxy-2,4-diketo-δ,δ-dibenzothiazolyl - butadienyl (1,3)]-tetrahydropyrimidine

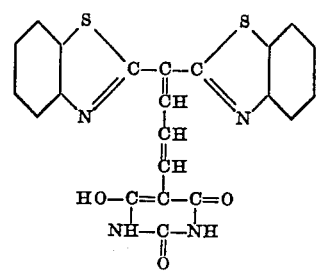

2.8 grams (1 mol) of methylene bis-benzthiazole and 2.8 grams (1 mol) of 5-(γ-acetanilido-allylidene)-2,4,6 - triketo - hexahydropyrimidine were mixed in 20 cc. of dry pyridine containing 1 cc. of trimethylamine. The mixture was boiled under reflux for 1½ hours, cooled and then diluted with 5 cc. of water. The mixture was stirred vigorously for a few minutes and then further diluted with 10 cc. of water. On standing, an oil separated out which was segregated from the supernatant liquid by decantation. The oil was dissolved in a minimum amount of methanol and diluted with 5% perchloric acid solution. The dye which separated was boiled out twice with 95% ethyl alcohol and then dried.

EXAMPLE XI

*2-thio-4-keto-6-hydroxy-5 - [δ - benzoxazolyl - δ-benzothiazolyl-butadienyl (1,3)] - tetrahydropyrimidine*

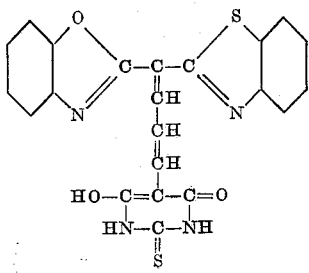

2.7 grams (1 mol) of 2-benzoxazolyl-2'-benzothiazolyl methane and 2.9 grams (1 mol) of 5-(γ-acetanilidoallylidene)-2-thio-4,6 - diketohexahydropyrimidine were mixed with 20 cc. of dry pyridine containing 1.0 cc. of triethylamine. The mixture was boiled under reflux for 1½ hours, cooled and then diluted with 5 cc. of water. The mixture was stirred vigorously for a few minutes and then further diluted with 10 cc. of water. On standing an oil separated out which was segregated from the supernatant liquid by decantation. The oil was dissolved in a minimum amount of methanol and diluted with 5% perchloric acid solution. The dye which separated was boiled out twice with 95% ethyl alcohol and then dried.

In the preparation of emulsions containing these trinuclear iminol cyanine dyes, the dye may be dissolved in methyl or ethyl alcohol and a volume of this solution containing from 5 to 50 milligrams of the dye added to a liter of emulsion. While in general practice it may not be necessary to add the dye in amounts larger than those above given, generally for satisfactory results, amounts usually ranging from 5 to 25 milligrams are sufficient to obtain the maximum sensitizing effect. However, I do not wish to limit my invention to the quantities just indicated, the most suitable amount will in each case be found by a few comparative experiments. The dyes may be added to the emulsion in the form of solutions. Suitable solvents as indicated in the examples are the alcohols, for instance, methyl or ethyl alcohol which may be anhydrous or diluted with a small volume of water. In actual practice, the dyes are applied to the emulsion during any stage of its production; however, they are preferably added to the finished emulsion before being cast.

The above examples are illustrative only, and should not be construed as limiting the invention, since it will be apparent to those skilled in the art, that the dyes of the present invention may be incorporated into photographic emulsions by methods other than those described herein.

The dyes of this invention are further characterized by their ability to form insoluble heavy metal salts, e. g., silver, lead and mercury salts, due to the presence of a salt-forming hydroxyl group in the merocyanine nucleus. Thus, for example, in the presence of silver ions insoluble silver salts are formed. These silver salts, moreover, are soluble in photographic processing baths, such as sodium thiosulfate. Accordingly, the dyes of this invention are readily applicable as non-diffusing photographic filter and anti-halation dyes in photographic materials in the form of their silver salts. The dyes may be incorporated directly into the photographic emulsion or applied in a known manner underneath the emulsion layer, intermediate layer between the support and emulsion, as a backing layer on the rear surface of the emulsion support, or as an interlayer between the two emulsion layers.

In the accompanying drawing, the two figures are enlarged section views of photographic elements having filter layers and anti-halation layers made according to the present invention.

Figure 1 represents an embodiment of the invention in which the filter layer is interposed between the emulsion and support.

Figure 2 represents an embodiment in which the anti-halation layer is in the form of a backing.

In Figures 1 and 2, 1 is the support, 2 the light-sensitive silver-halide emulsion layer, and 3 the gelatin filter or anti-halation layer.

The following examples illustrate the use of the dyes of this invention in the form of silver salts as filter and anti-halation agents.

EXAMPLE XII

A photographic filter layer was prepared by mixing the following ingredients to form a colored silver salt dispersion in gelatin:

Solution A

| | | |
|---|---|---|
| 2-thio-3-allyl-4-hydroxy-5- (β,β-dibenzoxazolyl-ethenyl) - dihydrothiazole | grams | 2.7 |
| Water | cc | 100 |
| Sodium carbonate (anhydrous) | grams | 2.1 |
| Gelatin (10% solution) | cc | 25 |

Solution B

| | | |
|---|---|---|
| Water | cc | 100 |
| Silver nitrate | grams | 1.7 |

Solution C

| | | |
|---|---|---|
| Gelatin (10% solution) | cc | 100 |

Solution B was added to Solution A with rapid stirring. After several minutes, Solution C was added. The silver of the silver nitrate formed a silver salt with the hydroxy group of the dye in the gelatin solution. The final gelatin suspension thus obtained was then coated on a photographic film in the customary manner to serve as a yellow filter layer for blue light absorption. The silver salt of the dye is non-diffusing.

The amount of silver salt used according to the present invention will vary somewhat, depending upon the color desired. In general, an amount more or less than that given in Example XII may be used for satisfactory results.

For the production of anti-halation coatings, the silver salts of the trinuclear iminol cyanine dyes of the present invention are incorporated into gelatin, treated with silver nitrate, and the dispersions thus obtained are cast in a known manner as coatings as an intermediate layer, between the support and the emulsion or as a backing layer on the rear surface of the emulsion support, or as a support on the emulsion, when the material is intended to be exposed through the support.

EXAMPLE XIII

A photographic anti-halation layer was prepared by mixing the following ingredients to form a colored silver salt dispersion in gelatin:

Solution A

| | | |
|---|---|---|
| 1-phenyl-3-methyl-5-hydroxy-4-[δ-benzoxa-δ-benzothiazolyl butadienyl (1,3)] - pyrazole | grams | 7.0 |
| Water | cc | 200 |
| Sodium hydroxide (4%) | cc | 7.5 |
| Gelatin (10% solution) | cc | 100 |

Solution B

| | | |
|---|---|---|
| Water | cc | 100 |
| Silver nitrate | grams | 3.4 |

Solution C

| | | |
|---|---|---|
| Gelatin (10% solution) | cc | 300 |

Solution B was added to Solution A with rapid stirring. After several minutes, Solution C was added. The final gelatin suspension of the silver salt thus obtained was coated on a support in the customary manner as an anti-halation layer.

The filter and anti-halo coatings prepared as described above have been found to have particularly good filter and anti-halant properties and to have no effect on the normal keeping properties of the light-sensitive layer.

It will be understood that where in the claims appended hereto the term "filter layer" is used, that such is intended to include anti-halation layer.

This application is a division of my co-pending application Serial No. 582,819, filed on March 14, 1945, now Patent No. 2,450,390 of Sept. 28, 1948, which in turn is a division of my application Ser. No. 573,631, filed on January 19, 1945, now Patent No. 2,471,996 of May 31, 1949.

While the present invention has been described in considerable detail with reference to certain preferred procedures, material and uses, it is understood that the new class of trinuclear iminol cyanine dyes and their use as sensitizing, filter and anti-halation dyes is not limited thereto, and that numerous variations and modifications described in the foregoing specification may be made as, for example, the dyes which contain a merocyanine nucleus, e. g., oxazoledione, hydantoin (imidazolone) and rhodanine nucleus, as illustrated in Examples II, III, and V to IX inclusive, may be further treated with a quaternizing compound such as methyl iodide. The quaternated compound is then condensed under reflux conditions with a cyclammonium base or salt such as N-methyl-2-methylbenzthiazole having a reactive methyl group in the alpha position to the nitrogen atom in the presence of a condensing agent such as pyridine, quinoline and the like. In the first reaction (alkylation), the trinuclear iminol cyanine is modified to the extent that the nitrogen atom in the 3-position of the oxazoledione, hydantoin or rhodanine ring is quaternized and the sulfur atom in the 2-position is converted to a thioether group. In the second reaction (condensation), the alkylated trinuclear iminol cyanine condenses with a cyclammonium base or salt whereby new compounds, which are also useful as sensitizers, filter and anti-halation agents, having the following general formulae are obtained:

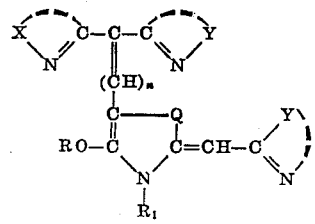

and

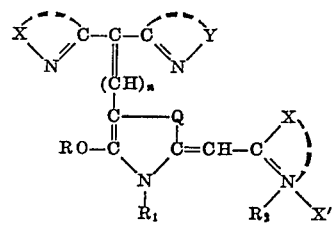

wherein R, X and Y and $n$ have the same values as in the above general formula, $R_1$ represents an alkyl, alkylene or aryl radical, $R_2$ represents an alkyl, X' represents an acid radical of the type usual in cyanine dyes and Q represents either nitrogen, oxygen or sulfur.

I claim:

1. A photographic light-sensitive element which comprises a gelatino silver-halide emulsion and a filter layer containing a hydroxy heavy metal salt of a trinuclear iminol cyanine dye characterized by the following general formula:

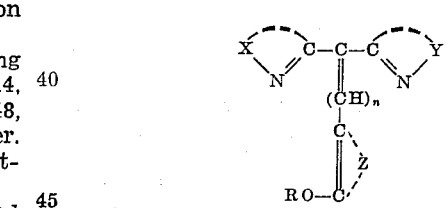

wherein X and Y represent the atoms necessary to complete a nitrogenous heterocyclic ring system, Z represents the atoms necessary to complete a member selected from the class consisting of a five-membered and six-membered heterocyclic ring system, $n$ represents a positive odd integer of from one to five, and R represents a heavy metal.

2. A photographic light-sensitive element which comprises a gelatino silver-halide emulsion and a filter layer containing a hydroxy heavy metal salt of a trinuclear iminol cyanine dye corresponding to the formula:

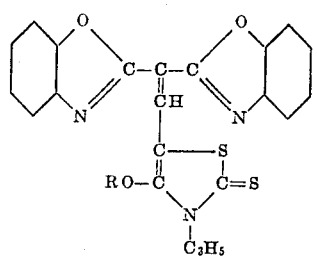

wherein R represents a heavy metal.

3. A photographic light-sensitive element which comprises a gelatino silver-halide emulsion and a filter layer containing a hydroxy heavy metal salt of a trinuclear iminol cyanine dye corresponding to the formula:

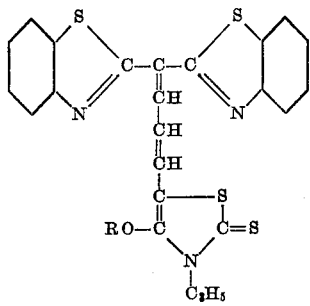

wherein R represents a heavy metal.

4. A photographic light-sensitive element which comprises a gelatino silver-halide emulsion and a filter layer containing a hydroxy heavy metal salt of a trinuclear iminol cyanine dye corresponding to the formula:

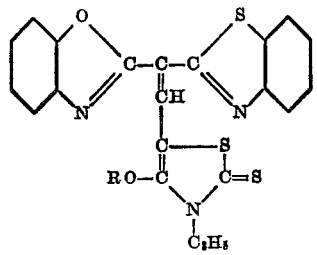

wherein R represents a heavy metal.

5. A photographic light-sensitive element which comprises a support, a gelatino silver-halide emulsion and a filter layer containing a silver salt having the general formula:

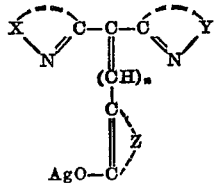

wherein X and Y represent the atoms necessary to complete a nitrogenous heterocyclic ring system, Z represents the atoms necessary to complete a member selected from the class consisting of a five-membered and six-membered heterocyclic ring system, and $n$ represents a positive odd integer of from one to five.

6. A photographic light-sensitive element which comprises a support, a gelatino silver-halide emulsion and a filter layer containing a silver salt corresponding to the formula:

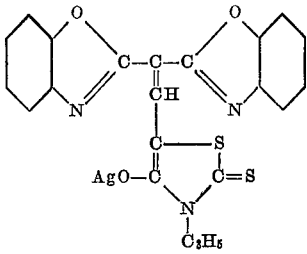

7. A photographic light-sensitive element which comprises a support, a gelatino silver-halide emulsion and a filter layer containing a silver salt corresponding to the formula:

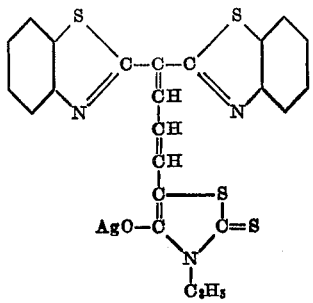

8. A photographic light-senstive element which comprises a support, a gelatino silver-halide emulsion and a filter layer containing a silver salt corresponding to the formula:

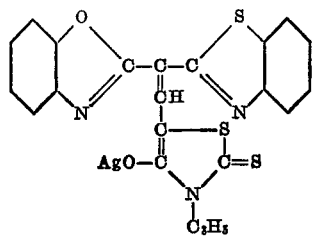

ALFRED W. ANISH.

REFERENCES CITED

The following references are of record in the file of this patent:

UNITED STATES PATENTS

| Number | Name | Date |
|---|---|---|
| 2,050,588 | Schneider | Aug. 11, 1936 |
| 2,298,731 | Brooker et al. | Oct. 13, 1942 |